United States Patent
Tanaka

(10) Patent No.: US 8,390,686 B2
(45) Date of Patent: Mar. 5, 2013

(54) SURVEILLANCE CAMERA APPARATUS AND SURVEILLANCE CAMERA SYSTEM

(75) Inventor: Yasunori Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 1626 days.

(21) Appl. No.: 11/523,006

(22) Filed: Sep. 19, 2006

(65) Prior Publication Data

US 2010/0265331 A1    Oct. 21, 2010

(30) Foreign Application Priority Data

Sep. 20, 2005  (JP) ................................ P2005-271873
Aug. 10, 2006  (JP) ................................ P2006-218250

(51) Int. Cl.
*H04N 7/18*    (2006.01)
(52) U.S. Cl. ........................................ 348/159; 348/143
(58) Field of Classification Search .................... None
See application file for complete search history.

(56) References Cited

U.S. PATENT DOCUMENTS

| | | | |
|---|---|---|---|
| 4,320,417 A * | 3/1982 | Hanma et al. ................. | 348/351 |
| 6,812,835 B2 | 11/2004 | Ito et al. | |
| 2002/0063711 A1 | 5/2002 | Park et al. | |
| 2004/0008773 A1* | 1/2004 | Itokawa ..................... | 375/240.08 |
| 2005/0012817 A1* | 1/2005 | Hampapur et al. ........... | 348/143 |
| 2005/0206726 A1* | 9/2005 | Yoshida et al. ............... | 348/143 |
| 2005/0275721 A1* | 12/2005 | Ishii ............................... | 348/159 |
| 2007/0126898 A1* | 6/2007 | Feldman et al. ............. | 348/294 |
| 2010/0002070 A1* | 1/2010 | Ahiska ........................... | 348/36 |

FOREIGN PATENT DOCUMENTS

| | | |
|---|---|---|
| JP | 9-55930 A | 2/1997 |
| JP | 9-322047 A | 12/1997 |
| JP | 9-322053 A | 12/1997 |
| JP | 10-3032 A | 1/1998 |
| JP | 2000-115621 A | 4/2000 |
| JP | 2001-245284 A | 9/2001 |
| JP | 2004-15516 A | 1/2004 |

OTHER PUBLICATIONS

Office Action dated Dec. 6, 2010 in European Application No. 06019559.1.
Zhou, Xuhui et al., "A Master-Slave System to Acquire Biometric Imagery of Humans at Distance," BNS, pp. 1-8, XP-002538254, Nov. 2003.
Office Action issued Jul. 10, 2009 in corresponding Chinese application No. 200610138814.7.

* cited by examiner

*Primary Examiner* — Joseph Ustaris
*Assistant Examiner* — Frederick Bailey
(74) *Attorney, Agent, or Firm* — Birch, Stewart, Kolasch & Birch, LLP

(57) ABSTRACT

A wide-angle camera is fixed to direct an optical axis in a fixed direction. A telephotographic camera can be inclined in panning and tilting directions to change an aiming direction of its optical axis. An image signal from the wide-angle camera is evaluated. When an image of a moving object is identified in a frame captured by the wide-angle camera, directivity information corresponding to a position of the moving object is calculated based on a relative position to the center of the frame. In accordance with the directivity information, posture of the telephotographic camera is controlled to aim its optical axis at the moving object. Thereafter, the posture of the telephotographic camera is controlled continuously to place the image of the moving object in the center of the frame captured by the telephotographic camera. The telephotographic camera captures the moving object while tracking it.

18 Claims, 8 Drawing Sheets

SURVEILLANCE CAMERA APPARATUS AND SURVEILLANCE CAMERA SYSTEM

BACKGROUND OF THE INVENTION

1. Technical Field

The invention relates to a surveillance camera apparatus and a surveillance camera system, which use plural kinds of cameras in combination so as to clearly capture an image of a moving object, which is a surveillance target within a wide surveillance area.

2. Description of Related Art

A surveillance camera apparatus for security on a coastland or a borderland is required to have a wide surveillance area. In this case, a camera-to-subject distance to be kept under surveillance reaches several kilometers to 10 or more kilometers. Also, it is desired that a surveillance camera apparatus for surveiling a road such as a general road and a highway has a camera-to-subject distance at least several tens to several hundreds meters. It is necessary that such a surveillance camera apparatus has a function of identifying a moving object, which is regarded as a surveillance target, in an early stage and a function of surveiling the moving object while tracking the moving object. According to the related art, a surveillance camera apparatus used for such a purpose captures a wide surveillance area while scanning the area with one camera being panned or tilted. Therefore, it cannot be said that the surveillance camera apparatus has sufficient reliability in surveillance of a transient phenomenon or a moving object.

Another system divides a surveillance area into a plurality of divisions, and allocate plural cameras to the divisions respectively for capturing. However, each camera is required to have a image-capturing lens with a focal length long enough to identify distant moving objects exactly. Such cameras naturally have narrow angles of view. Therefore, the number of divisions has to be increased and the cameras have to be provided for the divisions respectively in order to cover a wide surveillance area. As a result, the cost increases on a large scale, and the apparatus as a whole increases in size inevitably.

Of surveillance camera apparatuses for security, which serve as a part of measures for security, for example, JP Hei. 9-55930 A and JP 2004-15516 A combine a fixed wide-angle camera and a zoom camera having an optical axis whose direction can be changed desirably by a motor-driven camera platform and keep capturing a target moving object under surveillance by a zoom camera after the surveillance target is identified.

The surveillance camera apparatus according to JP Hei. 9-55930 A always captures the whole surveillance area by the wide-angle camera placed fixedly, and displays a thus-captured image on a monitor. When an operator operates a mouse on the monitor screen so as to specify a specific area on the screen, the optical axis of the zoom camera is directed to the specified area so as to capture the specified area with a high magnification. On the other hand, the surveillance camera apparatus according to JP 2004-15516 identifies a moving object in a captured screen based on image data captured by the wide-angle camera while the position coordinates of the moving object are calculated continuously. The optical axis of the zoom camera is directed in a direction corresponding to the calculated position coordinates so as to capture the moving object in an automatic tracking system.

The surveillance camera apparatus according to each reference is used in order to watch whether a moving object such as a suspicious person has intruded near or into a building. It is therefore satisfactory that the wide-angle camera can identify a moving object within a camera-to-subject distance ranging from about several meters to about several tens of meters. Accordingly, an image of the moving object having a certain size is contained in an image captured by the wide-angle camera. Thus, a specific area can be specified by manual operation as in the apparatus disclosed in JP Hei. 9-55930, or tracking information for the zoom camera can be acquired based on the image captured by the wide-angle camera as in the apparatus disclosed in JP 2004-15516.

SUMMARY OF THE INVENTION

However, for the purpose of surveiling a wide surveillance area such as a coastland or a borderland or for the purpose of surveiling a road such as a general road or a highway, the distance to a moving object to be watched often reaches several hundreds meters or longer. In this case, an image of the moving object can be observed only as a very small point image on the monitor screen of the wide-angle camera. It is therefore very difficult to identify the image of the moving object visually as in the apparatus disclosed in JP Hei. 9-55930. Further, the apparatus of JP Hei. 9-55930 requires manual operation for changing over to the zoom camera, so that the apparatus cannot be unmanned. On the other hand, the apparatus disclosed in JP 2004-15516 has a function of automatically tracking a moving object. However, even after the moving object is identified from an image of the wide-angle camera, tracking information is obtained based on an image captured by the wide-angle camera. Therefore, in a wide surveillance area such as a coastland or a borderland, the image of the moving object captured by the wide-angle camera can be observed only as a very small point image. Even if the tracking information is obtained based on such a small image captured by the wide-angle camera, the obtained tracking information would lack reliability. It is therefore difficult to accurately control the optical axis of the zoom camera having a narrow view angle. Once tracking is ceased, it is very difficult to resume the tracking. It is therefore impossible to obtain a sufficient effect of surveillance.

The invention has been made in view of the above circumstances and provides a surveillance camera apparatus and a surveillance camera system in which when a moving object to be watched is identified in a wide surveillance area to be captured by a wide-angle camera, a telephotographic camera having a high image-capturing magnification captures the moving object, and the moving object is tracked automatically and accurately so as to capture the moving object continuously.

According to an aspect of the invention, a surveillance camera apparatus includes a wide-angle camera, a telephotographic camera, a directivity information calculating unit, a camera posture control unit and a tracking information calculating unit. The wide-angle camera converts an optical image obtained through a wide-angle lens into a first image signal. The wide-angle camera outputs the first image signal. An optical axis of the wide-angle camera is fixed in a constant direction. The telephotographic camera converts an optical image obtained through a telephotographic lens into a second image signal. The telephotographic camera outputs the second image signal. The telephotographic camera is supported to be rotatable around at least one pivot axis so that an optical axis of the telephotographic camera can be tilted. The directivity information calculating unit identifies an image of a moving object within a image-capturing range of the wide-angle camera based on the first image signal from the wide-angle camera. The directivity information calculating unit calculates directivity information corresponding to a position of the image of the moving object within the image-capturing range. The camera posture control unit rotates the telephotographic camera around the pivot axis in accordance with the directivity information so as to direct the optical axis of the telephotographic camera at the moving object captured by the wide-angle camera. The tracking information calculating unit calculates tracking information, which is used to direct the optical axis of the telephotographic camera so as to place the image of the moving object at a center of a image-capturing range of the telephotographic camera, based on second image signals sequentially output from the telephotographic camera. After the tracking information is calculated, the camera posture control unit is controlled in real time using the tracking information in place of the directivity information and the telephotographic camera continuously captures the moving object.

Also, plural wide-angle cameras having different image-capturing ranges from each other may be used in combination. Also, a telephotographic lens may have a variable magnification function.

Also, it is preferable that the wide-angle camera comprises plural kinds of stationary cameras, which have different focal lengths, focus on longer distances as the focal lengths are longer and have image-capturing ranges substantially equivalent to each other. A near-side of a depth of field of one stationary camera may overlap a far-side of a depth of field of another stationary camera, whose focused position is adjacent to that of the one stationary camera. Thereby, it is possible to capture over the substantial entire image-capturing range with focusing a subject. In addition, at least one of the stationary cameras may include a combination of a plurality of camera modules, which have angles of view equal to each other, have focal lengths equal to each other and are arranged so that directions of capturing optical axes are different from each other. The camera modules individually may capture areas, which are defined by dividing the image-capturing range equally. Thereby, an image of a moving object under surveillance can be captured more larger and more clearly.

Also, plural telephotographic cameras and plural camera posture control units corresponding thereto respectively may be used together. Plural surveillance camera apparatuses having the configuration as above may be combined to form a surveillance camera system. In this case, the ranges captured by wide-angle cameras of the surveillance camera apparatuses may be made different from one another so that directivity information and tracking information obtained from the surveillance camera apparatuses are shared among the surveillance camera apparatuses for the sake of coordinated image-capturing operations. When this surveillance camera system is constructed, it will go well if the respective surveillance camera apparatuses are installed at places geographically distant from each other and the respective image-capturing ranges under surveillance are different from one another. That is, optical axes of wide-angle cameras belonging to the surveillance camera apparatuses may be parallel to one another.

When a moving object to be watched is identified based on an image captured by a wide-angle camera, the posture of a telephotographic camera is controlled so that its optical axis is aimed at the moving object. Thus, the moving object is captured in the center of the image-capturing range of the telephotographic camera. After that, the posture of the telephotographic camera is controlled by feedback control so that the image of the moving object is placed in the center of the image-capturing range of the telephotographic camera. It is therefore possible to capture the moving object continuously while tracking the moving object accurately. When a variable magnification function is provided for a lens of the telephotographic camera, the magnification of the telephotographic camera may be changed in accordance with the size of the image of the moving object contained within the image-capturing range of the telephotographic camera. It is therefore possible to capture the moving object with a suitable size.

If the view angle of the wide-angle camera is made too wide in order to expand the range where the wide-angle camera can capture, an image captured by the wide-angle camera will be smaller. Therefore, in an advantageous embodiment, a range to be captured may be divided into divisions, and a wide-angle camera is assigned to each division. Further, if plural kinds of stationary cameras, which have different focal lengths, focus on longer distances as the focal lengths are longer and have image-capturing ranges substantially equivalent to each other, are used as the wide-angle camera, when a moving object, which is a surveillance target, appears, the respective stationary cameras can capture the moving object with the substantially the same magnification ratio. Therefore, Not only it is easy to perform image recognition, but also it is easy to observe the moving object on the monitor. If a near-side of a depth of field of one stationary camera overlaps a far-side of a depth of field of another stationary camera, whose focused position is adjacent to that of the one stationary camera, any of the stationary cameras can capture the moving object clearly irrespective of the camera-to-subject distance. Also, it is advantageous to obtain an orientation direction of the telephotographic camera.

Further, in an effective embodiment, plural telephotographic cameras may be used to deal with plural moving objects, which may be identified in a range captured by a wide-angle camera. In this case, plural moving objects can be captured continuously while being tracked individually. Further, plural surveillance camera apparatuses having the configuration as set forth above may be combined so that directivity information and tracking information of the surveillance camera apparatuses are shared among the surveillance camera apparatuses. Thus, when a moving object is watched from different directions or when a moving object moves out of a surveillance area of one of the surveillance camera apparatuses, the moving object can be captured and tracked successively by another surveillance camera apparatus.

DETAILED DESCRIPTION OF EXEMPLARY EMBODIMENTS

Figure 1:
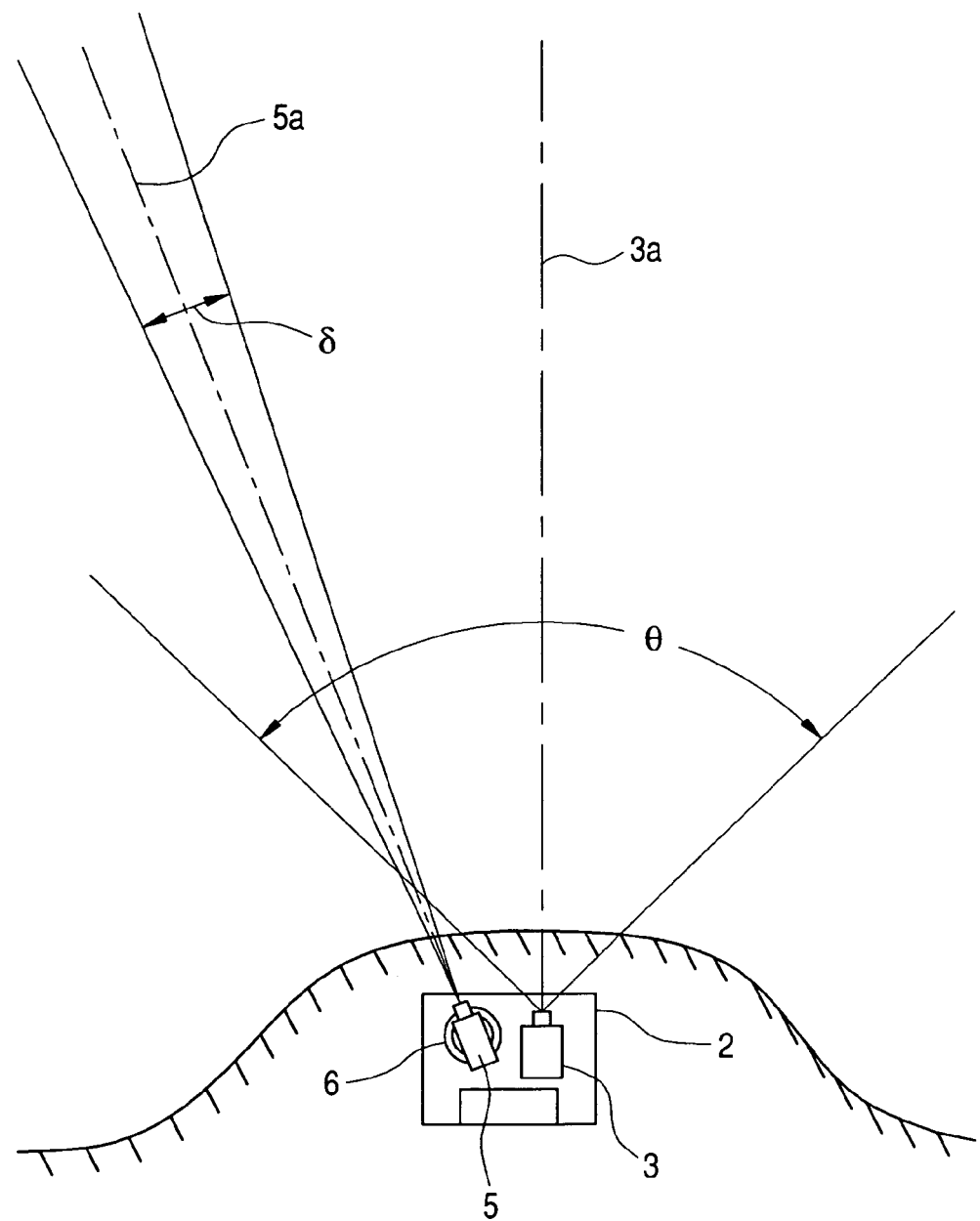
FIG. 1 is a schematic view showing a surveillance camera apparatus according to an embodiment of the invention.

A surveillance camera apparatus according to an embodiment of the invention has a configuration as schematically shown in FIG. 1. That is, the surveillance camera apparatus is configured so that a wide-angle camera 3 and a telephotographic camera 5 are installed on a base 2 installed, for example, at the tip of a cape. A optical axis 3a of the wide-angle camera 3 is fixedly directed in a constant direction. On the other hand, the telephotographic camera 5 is movably supported by a motor-driven pedestal (posture control unit) 6 provided between the telephotographic camera 5 and the base 2. Thus, an optical axis 5a of the telephotographic camera 5 can be inclined in a panning direction and a tilt direction.

The surveillance area of this surveillance camera apparatus depends on the angle θ of view of the wide-angle camera 3. The angle with which the telephotographic camera 5 can pan has a range large enough to cover at least the angle θ of view of the wide-angle camera 3 around a reference position where the optical axis 5a is set in parallel to the optical axis 3a of the wide-angle camera 3. Of course, this panning angle may be further expanded. The angle δ of view of the telephotographic camera 5 is much narrower than the angle θ of view of the wide-angle camera 3. For example, the angle θ of view of the wide-angle camera 3 is about 80° (focal length 25 mm) on a 135 film camera basis, and the angle δ of view of the telephotographic camera 5 is about 6° (focal length 400 mm) in a low magnification mode.

The telephotographic camera 5 does not have to have a variable magnification function. However, in this embodiment, as will be described later, the telephotographic camera 5 has a variable magnification function of two modes, that is, a high magnification mode and a low magnification mode. When the telephotographic camera 5 is changed over to the high magnification mode, the angle δ of view becomes about 2.5° (focal length 1000 mm). Although the angle of view is generally determined based on the length of a diagonal line of a photographed screen on an imaging surface and a focal length of the lens, the angle of view will be described as an angle of view in a horizontal direction here for convenience of explanation.

Figure 2:
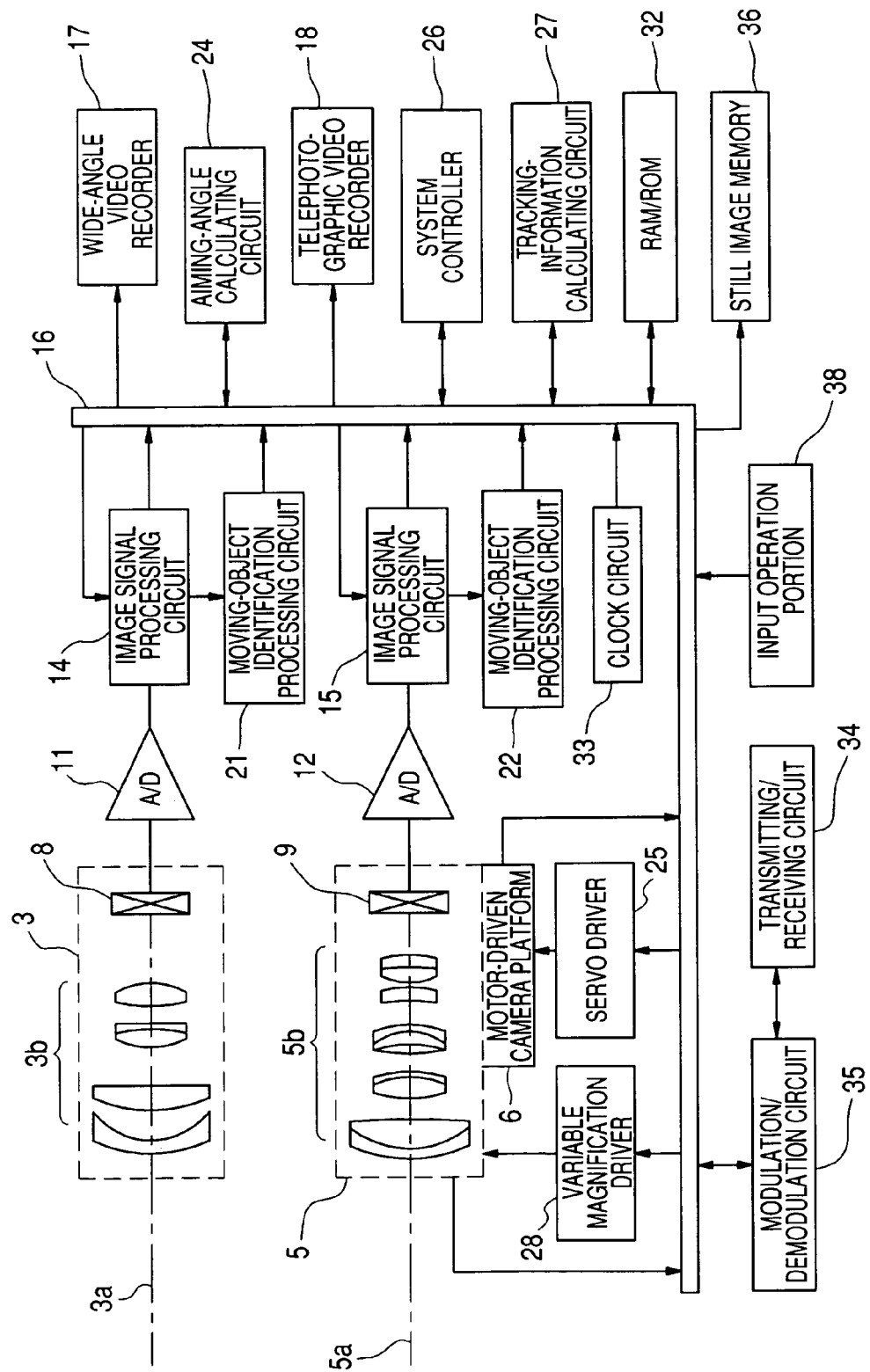
FIG. 2 is a block diagram schematically showing an electric configuration of the surveillance camera apparatus.

FIG. 2 shows the schematic configuration of the surveillance camera apparatus. In FIG. 2, the wide-angle camera 3 captures an image using a CCD-type or CMOS-type image sensor 8 disposed on an imaging surface of a wide-angle lens 3b. The telephotographic camera 5 captures an image using a similar image sensor 9 disposed on an imaging surface of a telephotographic lens 5b. In order to avoid the complication of the drawing, an exposure adjustment unit such as aperture to be incorporated in each lens system is not shown. Fundamentally, these wide-angle lens 3b and telephotographic lens 5b may be single focus lenses, respectively. With regard only to the telephotographic lens 5b, the lenses 3b and 5b may have a variable magnification function or a zoom function. In the embodiment described here, the wide-angle lens 3b is a single focus lens, while the telephotographic lens 5b has a variable magnification function of two modes.

Image signals output from the image sensors 8 and 9 are converted into digital signals by A/D converters 11 and 12 each having a preamplifier function, and input into image signal processing circuits 14 and 15, respectively. The image signal processing circuits 14 and 15 perform known image processing upon the signals input thereto, respectively. The processed signals are input into a bus line 16 sequentially as digital image signals each corresponding to a single frame. These image signals are recorded as moving image data by a wide-angle video recorder 17 and a telephotographic video recorder 18. When these moving image data are recorded, the data may be supplied to the bus line 16 in the form of image signals subjected to suitable data compression processing in the image signal processing circuits 14 and 15.

The image signals, which are input from the image signal processing circuits 14 and 15 respectively and each correspond to a single screen, are further input to moving-object identification processing circuits 21 and 22, respectively. Each moving-object identification processing circuit 21, 22 compares image signals, which are input thereto sequentially and each correspond to a single frame, sequentially with each other. Thus, the moving-object identification processing circuit 21, 22 determines whether or not a moving object is in the frame. When a moving object intrudes into the frame of the image signal obtained from the wide-angle camera 3, the image of the moving object moves in the frame because the optical axis 3a is fixed. When the moving object image is identified by the moving-object identification processing circuit 22, a aiming-angle calculating circuit 24 functions as a directivity information calculating unit, which calculates a direction and an angle with which the moving object is displaced with respect to the optical axis 3a based on the position coordinates of the image of the moving object within the captured frame. The aiming direction of the optical axis 3a of the wide-angle camera 3 and the focal length of the wide-angle lens 3b are known in advance. Accordingly, if it is known how far the position where the image of the moving object is being captured is displaced from the center of the frame, it is possible to easily obtain the direction and the angle with which the moving object is displaced from the optical axis 3a.

A servo driver 25 drives the motor-driven camera platform 6 so as to control the posture of the telephotographic camera 5. The wide-angle camera 3 and the telephotographic camera 5 are placed on the common base 2, and their relative position relationship is known in advance. Accordingly, when the directivity information from the aiming-angle calculating circuit 24 is input to the servo driver 25, the optical axis 5a of the telephotographic camera 5 can be aimed at the moving object. Generally, the image of the moving object has a certain area in the photographed frame. Preferably, the optical axis 5a is controlled to be aimed at the centroid of the image of the moving object. From the motor-driven camera platform 6, posture information of the telephotographic camera 5, that is, information indicating the direction and the angle with which the optical axis 5a is displaced from the optical axis 3a is always fed back to a system controller 26 via the bus line 16.

The image signals from the telephotographic camera 5 are also input to the other moving-object identification processing circuit 22. This moving-object identification processing circuit 22 determines whether or not the frame captured by the telephotographic camera 5 includes an image, which moves over time, in the same manner as the moving-object identification processing circuit 21. A tracking-information calculating circuit 27 starts processing in response to the event that the moving-object identification processing circuit 22 identifies the image of the moving object. The tracking-information calculating circuit 27 compares the image signals each corresponding to a single frame sequentially with each other and calculates a movement vector of the image of the moving object. Further, the tracking-information calculating circuit 27 calculates information to cancel the movement vector. This information corresponds to information to correct the aiming direction of the optical axis 5a so as to bring the centroid of the image of the moving object into line with the center of the frame captured by the telephotographic camera 5. The information is used as tracking information of the telephotographic camera 5.

A variable magnification driver 28 serves to change over the magnification of the telephotographic lens 5b. The variable magnification driver 28 operates in accordance with a command from the system controller 26. The system controller 26 performs sequence control including the aforementioned processing upon the surveillance camera apparatus as a whole. A sequence program for performing the sequence control is stored in a ROM area of a memory 32 together with various kinds of initial setting information including installation position information of the surveillance camera apparatus. When the sequence program is executed, a RAM area of the memory 32 is used as a work area for storing temporary data or flags. A clock circuit 33 divides a clock pulse so as to generate date and time information. The date and time information is used for recording and overlaying date and time data on moving image data recorded by the wide-angle video recorder 17 and the telephotographic video recorder 18.

A transmitting/receiving circuit 34 and a modulation/demodulation circuit 35 are provided so that the surveillance camera apparatus can be operated remotely and/or a captured image can be observed even in a remote position in accordance with necessity. Further, the transmitting/receiving circuit 34 and the modulation/demodulation circuit 35 can be used for always receiving a clock radio wave from a radio controlled clock so as to correct the clock information obtained from the clock circuit 33. A still image memory 36 serves to record still images when particularly the still images as well as moving images recorded by the wide-angle video recorder 17 or the telephotographic video recorder 18 are required. In order to record clearer images, it is advantageous to increase the number of pixels in the image sensors 8 and 9. When fast processing is required for moving images and only the moving images subjected to compression processing can be recorded, it is preferable to use the still image memory 36 to record still images at suitable intervals. An input operation portion 38 serves to carry out input operations such as initial settings on the surveillance camera apparatus, changes of various parameters, etc.

Description will be made below about the case where the aforementioned surveillance camera apparatus is used for watching a coastland, for example, watching whether a suspicious ship approaches or not. In a normal surveillance mode, the wide-angle camera always takes a photograph, and the moving-object identification processing circuit 21 is actuated in response to an image signal from the image signal processing circuit 14. Light reflected by the sea level can be regarded as substantially constant in a time average manner. A change of the image signal caused by a change of weather can be identified as a change of the photographed screen as a whole. In such a situation, no moving object image is identified. Thus, no image is recorded by the wide-angle video recorder 17. When setting is done in advance by the input operation portion 38, moving images may be recorded at suitable timings and intervals even in such a situation.

Figure 3:
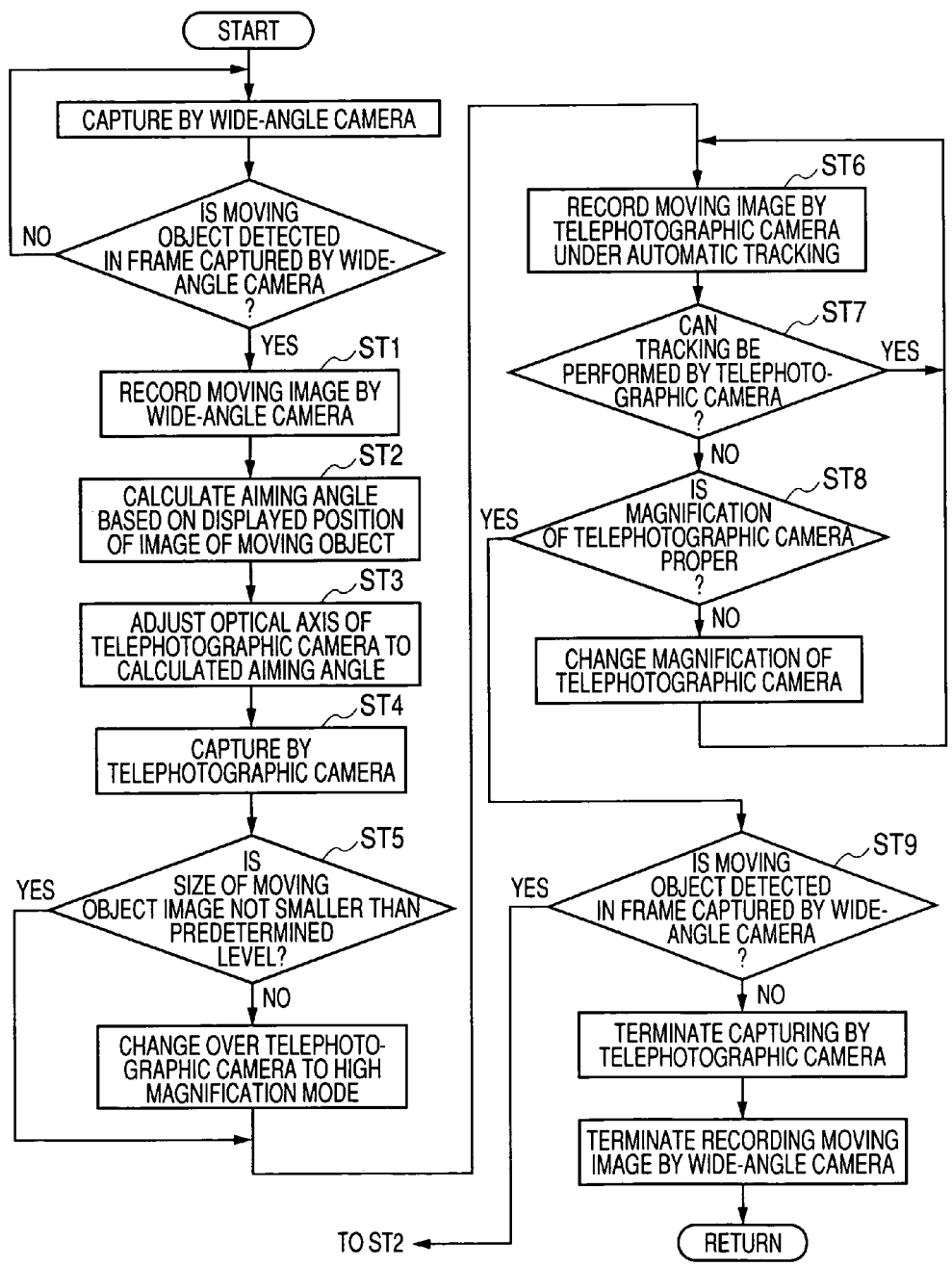
FIG. 3 is a flow chart showing a fundamental process of the surveillance camera apparatus.
Figure 4A:
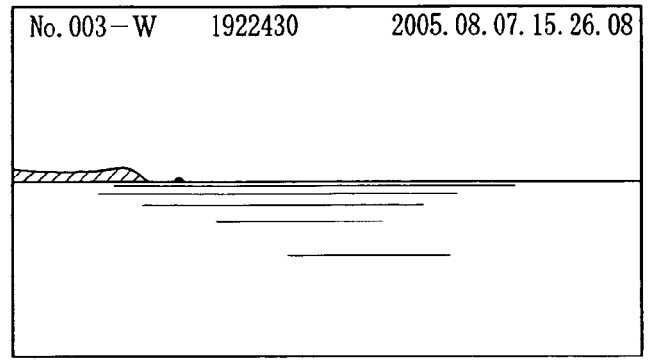
FIGS. 4A-4C are explanatory views showing examples of images obtained by the surveillance camera apparatus.

As shown in FIG. 4A, when a suspicious ship appears from behind an island, the moving-object identification processing circuit 21 identifies this as an image of a moving object. In response to an identification signal obtained thus, the system controller 26 sends a record command to the wide-angle video recorder 17. Thus, images captured by the wide-angle camera 3 begin to be recorded as shown by Step ST1 in FIG. 3. At the same time, the aiming-angle calculating circuit 24 calculates the direction and the angle with which the moving object is displaced with respect to the optical axis 3a (the center of the captured frame) of the wide-angle camera 3, based on the position of the image of the moving object within the frame captured by the wide-angle camera 3.

The altitude of the wide-angle camera 3 and the direction angle of the optical axis 3a are known when the surveillance camera apparatus is installed. These pieces of information are input from the input operation portion 38 and written into a predetermined area of the memory 32 in advance. The direction angle of the moving object can be therefore obtained in accordance with on which side the moving object image is displaced, left or right, and how large angle the image of the moving object is displaced with respect to the horizontal direction of the captured frame. The direction angle obtained thus is recorded to be overlaid on an image recorded by the wide-angle video recorder 17. FIG. 4A shows an example of the recorded image. Number information for specifying the surveillance camera apparatus, camera information "No. 003-W" designating a video image of the wide-angle camera 3, a direction angle "1922430" (designating a direction angle 192°24'30" when the north is regarded as 0°) of the moving object at the present time, and date and time "2005.08.07.15.26.08" (15:26:8, Aug. 7, 2005) are recorded so as to be overlaid on the recorded image.

A moving object may be displaced from the optical axis 3a not only horizontally but also vertically. The aiming-angle calculating circuit 24 obtains the directions and the angles with which the moving object is displaced from the optical axis 3a, in both the horizontal direction and the vertical direction (Step ST2). The obtained directions and angles are output as directivity information. The system controller 26 supplies a drive signal to the servo driver 25 based on the directivity information. As a result, the motor-driven camera platform 6 is operated to control the posture of the telephotographic camera 5 so that the optical axis 5a is aimed at the moving object (Step ST3). The relative position relationship between the wide-angle camera 3 and the telephotographic camera 5 is known. The motor-driven camera platform 6 can change the optical axis 5a not only horizontally (panning direction) but also vertically (tilt direction). Therefore, the optical axis 5a of the telephotographic camera 5 can be aimed at the moving object accurately based on the directivity information obtained as described above. The posture of the telephotographic camera 5 is controlled so that the optical axis 5a is aimed at the moving object and then, the telephotographic camera 5 starts capturing (Step ST4).

Figure 4B:
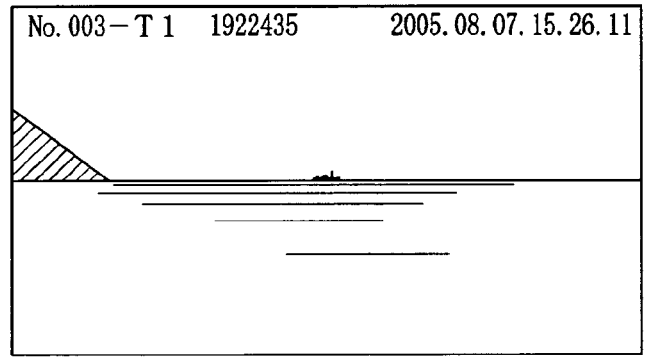
Figure 4C:
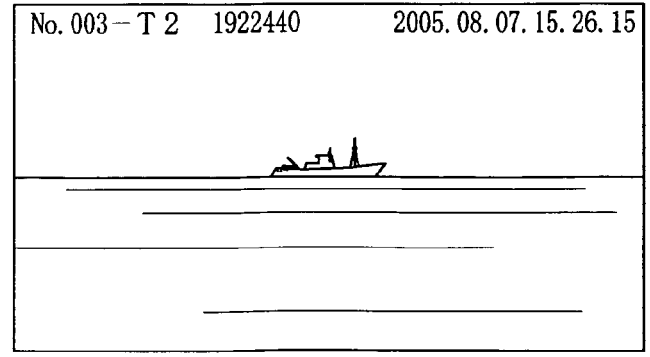

The image signal from the telephotographic camera 5 is input to the moving-object identification processing circuit 22, which determines whether or not the image of the moving object is included in the screen of the telephotographic camera 5. When the moving object image is identified, whether or not the size of the image of the moving object in the captured frame reaches a predetermined level is determined based on the number of pixels occupied by the image of the moving object (Step ST5). If the size of the image of the moving object is less than a predetermined level, the magnification of the telephotographic lens 5b is changed over. FIG. 4B shows an example of a recorded image before the magnification is changed over, and FIG. 4C shows a recorded image after the magnification is changed over. Various pieces of information such as number information for specifying the surveillance camera apparatus, a direction angle of the moving object at the present time, and date and time are recorded to be overlaid on each of the recorded images, in the same manner as the recorded images of the wide-angle camera 3. Information "T1" or "T2" designating which magnification, lower magnification or high magnification, was used when the image was captured by the telephotographic camera 5 is added to the number information.

When the telephotographic camera 5 starts capturing images, the tracking-information calculating circuit 27 compares the images, which are obtained by the telephotographic camera 5 and each correspond to a singled frame, sequentially with each other. Then, the tracking-information calculating circuit 27 calculates tracking information sequentially so as to bring the centroid of the image of the moving object into line with the center of the frame captured by the telephotographic camera 5. The calculated tracking information is supplied to the servo driver 25 in real time. In accordance with the tracking information, the motor-driven camera platform 6 is controlled by feedback control. Thus, moving image recording is performed continuously so that the image of the moving object is always captured in the center of the frame captured by the telephotographic camera 5 (Steps ST6-ST7). The moving image recording is continued as long as the suspicious ship falls within the range of the view angle θ of the wide-angle camera 3. The telephotographic camera 5 performs automatic tracking based on the image of the moving object in the frame captured by the telephotographic camera 5. If the movable range of the motor-driven camera platform 6 is expanded beyond the border of the view angle θ of the wide-angle camera 3, the telephotographic camera 5 can perform the automatic tracking so that the moving image recording can be continued.

When the suspicious ship moves far away or gets close during the moving image recording continued by the telephotographic camera 5, the image of the moving object within the captured frame becomes too small or too large for the moving-object identification processing circuit 22 to identify the centroid of the image of the moving object properly. When the automatic tracking cannot be performed (Step ST7), it is determined in Step ST8 whether or not the magnification of the telephotographic camera 5 is suitable. When low magnification is used even though the image of the moving object is too small or when high magnification is used even though the moving object image is too large, the magnification is changed over to a suitable one. After that, the routine of processing returns to Step ST6, where similar processing is performed continuously.

Even if the telephotographic camera 5 performs tracking with a proper magnification, the view angle of the telephotographic camera 5 becomes narrower than that of the wide-angle camera 3. Therefore, the automatic tracking only by the telephotographic camera 5 may be interrupted due to disturbance noise or unintended impact. In such a case, processing of Step ST9 is performed to calculate the aiming direction and aiming angle of the telephotographic camera 5 again based on the image captured by the wide-angle camera 3. Then, processing on and after Step ST2 is repeated. When the image of the moving object cannot be placed in the frame captured by the wide-angle camera 3, it is stopped that the telephotographic camera 5 captures images and that moving image is recorded. On the other hand, the wide-angle camera 3 continues captures images but it is stopped that moving image is recorded using the wide-angle camera 3.

The wide-angle camera 3 captures images and records moving image continuously when the telephotographic camera 5 records moving image continuously while performing automatic tracking. Accordingly, the position of the image of the moving object in the frame captured by the wide-angle camera 3 can be monitored continuously. It is therefore preferable to record data of the position of the image of the moving object. In place of the processing of Step ST9, the routine of processing may move to the processing of Step ST3 after the aiming direction and aiming angle of the telephotographic camera 5 is read with reference to this position data. The telephotographic lens 5b used in the telephotographic camera 5 may be constituted by a zoom lens. In this case, moving image is recorded while the magnification of the telephotographic camera 5 is sequentially changed to keep the size of the image of the moving object substantially constant in the captured image.

According to the surveillance camera apparatus, as described above, a wide surveillance area is captured by the wide-angle camera having a large angle of view. When an image of a moving object to be watched is captured within a frame captured by the wide-angle camera, it is started that the wide-angle camera records moving image while the aiming direction and aiming angle of the telephotographic camera 5 are calculated based on image data from the wide-angle camera 3. Thus, the telephotographic camera 5 is aimed at the moving object to be watched. After that, moving image is recorded while the moving object is automatically tracked based on image data from the telephotographic camera 5. As compared with a system where a telephotographic camera tracks a moving object depending only on image data from a wide-angle camera, the accuracy of automatic tracking can be therefore improved on a large scale once the moving object is captured by the telephotographic camera 5. At the same time, image data from the wide-angle camera 3 are recorded sequentially. Even if the automatic tracking by the telephotographic camera 5 is interrupted, tracking and capturing can be resumed easily.

Figure 5:
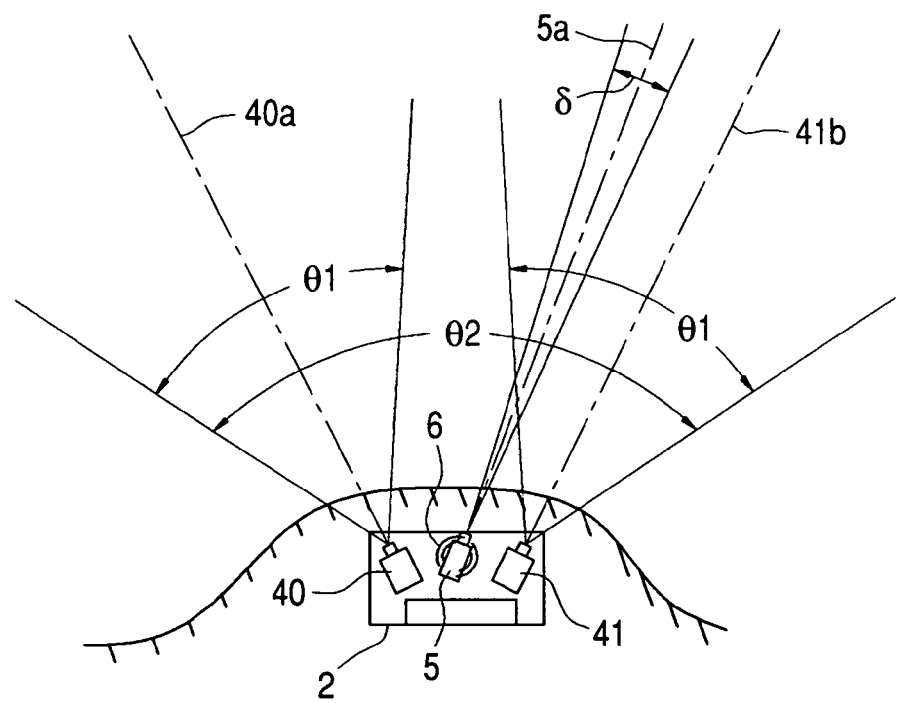
FIG. 5 is a schematic view showing another embodiment of the invention.

FIG. 5 shows another embodiment of the invention. In this surveillance camera apparatus, two wide-angle cameras 40 and 41 and one telephotographic camera 5 are combined. The wide-angle cameras 40 and 41 are fixed to a common base 2 with their optical axes 40a and 41a displaced from each other by a fixed angle. The wide-angle cameras 40 and 41 have an equal view angle θ1. When the angle between the optical axes 40a and 41a is made a little narrower than the view angle θ1, the surveillance area can be expanded to θ2 (≈2θ1) due to the combination of the two wide-angle cameras 40 and 41. As compared with the case where a single wide-angle camera captures the same surveillance area, the view angle of each wide-angle camera can be made narrower. Accordingly, the size of an image of a moving object to be watched increases, so that the moving object in the captured frame can be identified more easily.

For example, assume that an image of a moving object is identified in a frame captured by the wide-angle camera 40 when the wide-angle cameras 40 and 41 are capturing. Then, it is started that the wide-angle camera records moving image while the aiming direction and aiming angle of the telephotographic camera 5 (view angle δ) are calculated in the same manner as in the previous embodiment. The motor-driven camera platform 6 directs the optical axis 5a of the telephotographic camera 5 at the moving object. After that, moving image is recorded under automatic tracking by the telephotographic camera 5 in the same manner. Assume that the moving object moves in the right direction in the figure and the image of the moving object is identified in the frame captured by the wide-angle camera 41. Then, it is started that the wide-angle camera 41 records moving image. The panning-direction movable range of the motor-driven camera platform 6 is set to be not narrower than the angle θ2 in advance. Accordingly, the telephotographic camera 5 records moving image continuously under the automatic tracking where the image of the moving object is continuously placed in the center of the frame captured by the telephotographic camera 5.

Figure 6:
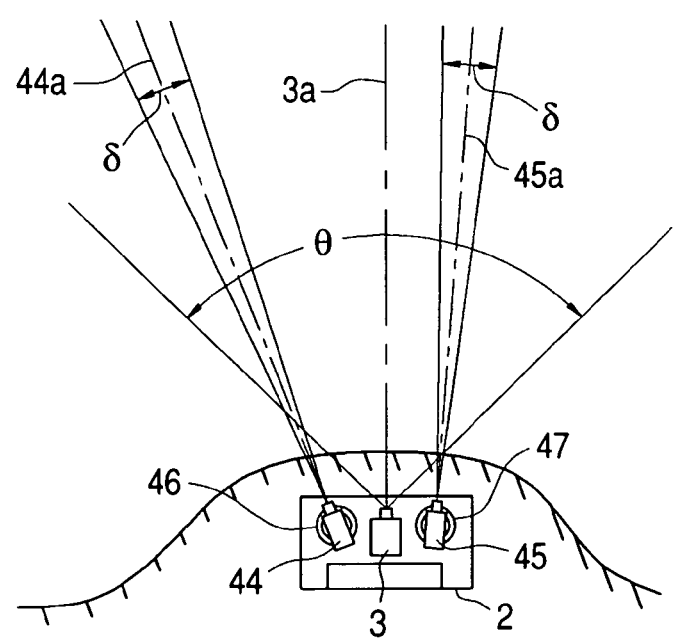
FIG. 6 is a schematic view showing another embodiment of the invention.

In an embodiment shown in FIG. 6, a surveillance camera apparatus is constituted by one wide-angle camera 3 and two telephotographic cameras 44 and 45. The wide-angle camera 3 is fixed to a base 2, and its optical axis 3a is aimed at a fixed direction. The telephotographic cameras 44 and 45 are supported on motor-driven pedestals 46 and 47, respectively. The motor-driven pedestals 46 and 47 can move in the panning direction and the tilt direction with respect to the base 2. The aiming angles of optical axes 44a and 45a in the panning direction can be changed desirably within a view angle θ of the wide-angle camera 3.

When an image of a first moving object is captured in a frame captured by the wide-angle camera 3, the moving-object identification processing circuit 21 and the aiming-angle calculating circuit 24 calculates the aiming direction of one telephotographic camera 44 and directs the optical angle 44a of the telephotographic camera 44 at the moving object. The telephotographic camera 44 starts recording moving image while performing automatic tracking so that the image of the moving object can be placed in the center of a frame captured by the telephotographic camera 44. When an image of a second moving object is captured in the frame captured by the wide-angle camera 3, similar processing is performed to calculate the aiming direction of the telephotographic camera 45 and direct the optical angle 45a of the telephotographic camera 45 at the moving object. Then, the telephotographic camera 45 also starts recording moving image while performing automatic tracking so that the image of the moving object can be placed in the center of a frame captured by the telephotographic camera 45. As a result, even when two moving objects to be watched appear concurrently, the moving objects can be kept under continuous surveillance individually. Of course, if the number of telephotographic cameras is increased, the number of moving objects that can be simultaneously surveiled can be increased.

Figure 7:
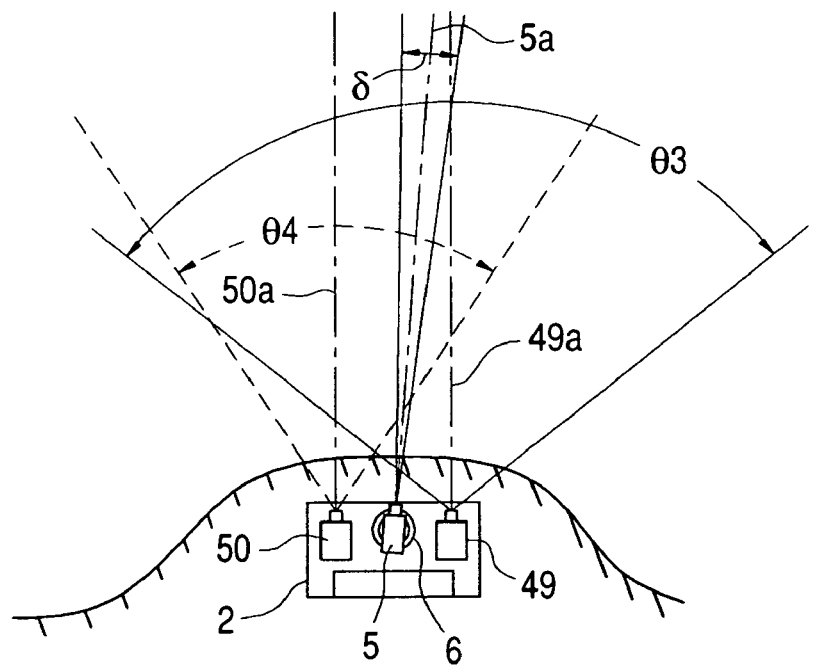
FIG. 7 is a schematic view showing further another embodiment of the invention.

FIG. 7 shows an embodiment where two wide-angle cameras and one telephotographic camera are combined. The first wide-angle camera 49 and the second wide-angle camera 50 are fixed to a base 2, and their optical axes 49a and 50a are directed in one and the same direction. A view angle θ3 of the first wide-angle camera 49 is wider than a view angle θ4 of the second wide-angle camera 50. Accordingly, the image-capturing magnification of the second wide-angle camera 50 is higher than that of the first wide-angle camera 49. The telephotographic camera 5 having a view angle δ is supported on the base 2 through a motor-driven camera platform 6 so that an optical axis 5a can be inclined in the panning direction and the tilt direction.

The first and second wide-angle cameras 49 and 50 always perform a capturing operation. In the same manner as in the previous embodiments, the first and second wide-angle cameras 49 and 50 start recording moving image as soon as they identify an image of a moving object appearing in each frame captured by the first and second wide-angle cameras 49 and 50. Due to the relation θ3>θ4, the first wide-angle camera 49 is advantageous due to its wider image-capturing range. However, when a moving object to be watched appears far away, the size of the image of the moving object in the photographed screen becomes smaller. On the contrary, the second wide-angle camera 50 has a narrower image-capturing range. However, the second wide-angle camera 50 is advantageous in that it can capture a larger image of the moving object. When any one of the wide-angle cameras identifies an image of a moving object, the aiming direction and aiming angle of the telephotographic camera 5 are calculated. Based on the calculated aiming direction and aiming angle, the optical axis 5a of the telephotographic camera 5 is aimed at the moving object. After that, the telephotographic camera 5 starts capturing images and recording moving image continuously under automatic tracking in the same manner as in the previous embodiments. Of the first and second wide-angle cameras 49 and 50, one which has identified the image of the moving object records moving image. However, when one of the wide-angle cameras identifies an image of a moving object, the other wide-angle camera may also start recording moving image.

Assume that plural wide-angle cameras having different view angles and aimed in one and the same direction are used. Particularly, assume that each wide-angle camera has higher resolution than a generally and widely used camera, and that those focus positions are fixed. In this case, it is preferable that the wide-angle cameras are used so that their optimum camera-to-subject distances are set to differ from one another in accordance with their view angles. For example, the focus of the first wide-angle camera having the narrowest view angle is set so that camera-to-subject distances ranging from 0 km to 2 km are included in its depth of field. Next, the focus of the second wide-angle camera having the second widest view angle is set so that camera-to-subject distances ranging from 2 km to 5 km are included in its depth of field. Further, the focus of the third wide-angle camera having the widest view angle is set so that camera-to-subject distances ranging from 5 km to 10 km are included in its depth of field. Thus, clear image capturing can be performed over a wide range of camera-to-subject distances. As for a long range where clear image capturing cannot be performed even by the wide-angle camera whose focus is set in the farthest, a telephotographic camera which has a narrow view angle but can capture and enlarge an object directly may be used to capture under automatic tracking in the aforementioned manner.

Figure 8:
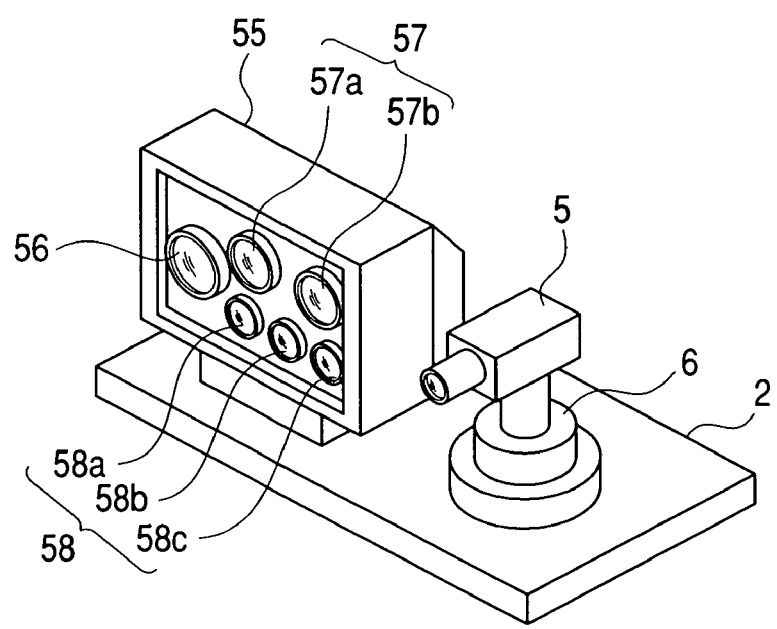
FIG. 8 is an appearance view showing still another embodiment of the invention.

Still another embodiment of the invention will be described. In this embodiment, a combination of plural kinds of stationary cameras is used as the wide-angle camera used in the previous embodiment. Points of focus of these stationary cameras are set to finite camera-to-subject distances. In FIG. 8, as in the previous embodiment, the common base 2 supports the telephotographic camera 5 through the motor-driven camera platform. Also, a cameral casing 55 is fixed to the common base 2. A first camera 56, a second camera 57 and a third camera 58, which function as three kinds of stationary cameras, are incorporated into the camera casing 55. As shown in FIG. 8, the first camera 56 is made up of a single camera module. The second camera 57 is made up of two camera modules 57a, 57b. The third camera 58 is made up of three camera modules 58a, 58b, 58c.

Figure 9:
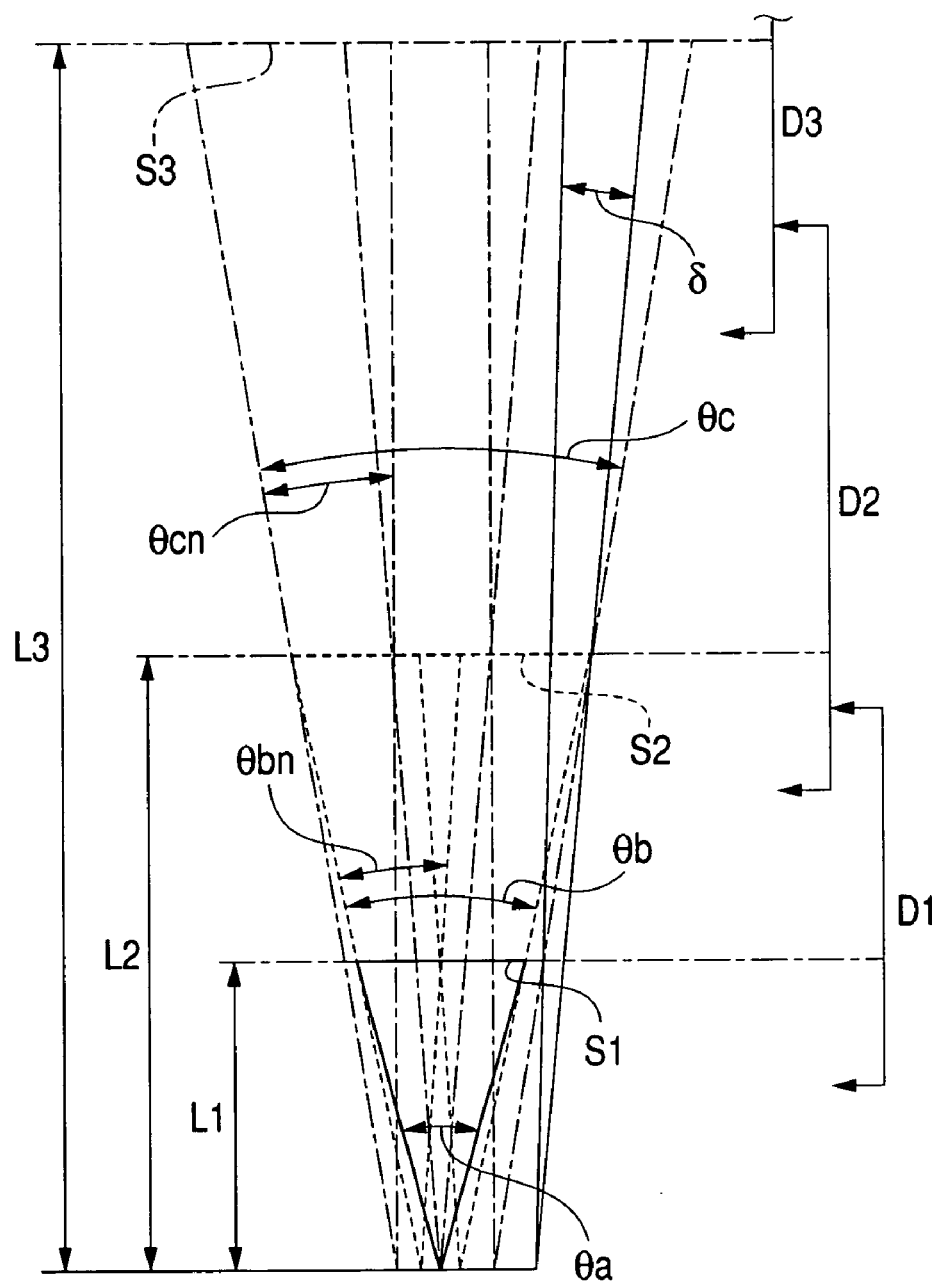
FIG. 9 is a schematic view showing a capturing mode in the embodiment shown in FIG. 8.

FIG. 9 schematically shows a capturing mode by the first to third cameras 56 to 58. The first camera 56 focuses a camera-to-subject distance L1 and captures an image-capturing range S1 if an angle of view θa is used. The camera 56 has the shortest camera-to-subject distance among the cameras 56 to 58, and has a depth of field D1 if a normal aperture stop is used. The second camera 57 made up of the two camera modules 57a, 57b focuses a camera-to-subject distance L2, and the entire second camera 57 captures an image-capturing range S2 if an angle of view θb is used. The camera modules 57a, 57b have the same optical parameters, and have the same focal distance and the same angle of view θbn.

Directions of image-capturing optical axes of the camera modules 57a, 57b are determined so that if the angle of view θbn is used in the respective camera modules 57a, 57b, the camera modules 57a, 57b can capture areas, which are defined by dividing the image-capturing range S1 of the first camera 56 into two, individually. Thereby, the entire second camera 57 has the angle of view θb. The focal lengths of the camera modules 57a, 57b are longer than that of the first camera 56. The camera modules 57a, 57b focus the camera-to-subject distance L2, and the entire second camera 57 captures the image-capturing range S2. At this time, the second camera 57 has a depth of field D2 if a normal aperture stop is used. The near side of the depth of field D2 of the second camera 57 partially overlaps the far side of the depth of field D1 of the first camera 56. In a center part of the image-capturing range S2, image-capturing ranges of the camera modules 57a, 57b partially overlap each other. However, if trimming process is performed when the respective captured image are combined into one, an appropriate monitor screen can be displayed for the second camera 57.

The third camera 58 made up of the camera modules 58a to 58c focuses the camera-to-subject distance L3, and the entire third camera 58 captures an image-capturing range S3 if an angle of view θc is used. The camera modules 58a to 58c have the same optical parameters, and have the same focal distance and the same angle of view θcn. Directions of image-capturing optical axes of the camera modules 58a to 58c are determined so that if the angle of view θcn is used in the respective camera modules 58a to 58c, the camera modules 58a to 58c can capture areas, which are defined by dividing the image-capturing range S2 of the second camera 57 into three, individually. The focal length of the third camera 558 is longer than that of the second camera 57. The third camera 57 has a depth of field D3 if a normal aperture stop is used. The near side of the depth of field D3 of the third camera 58 partially overlaps the far side of the depth of field D2 of the second camera 57. In the image-capturing range S3 of the entire third camera 58, respective image-capturing ranges of the camera modules 58a to 58c partially overlap each other. However, if trimming process is performed when the respective captured image are combined into one, an appropriate monitor screen can be displayed for the third camera 58.

As described above, the angle of view θb of the second camera 57 is determined so as to cover the image-capturing range S1 of the first camera 56 and further the angle of view θc of the third camera 58 is determined so as to cover the image-capturing range S2 of the second camera 56. Thereby, whenever a particular subject comes into the image-capturing range of any of the cameras, at least two cameras can capture the particular subject. In most cases, the three cameras can capture the particular subject. Also, the depths of field of the first to third cameras 56 to 58 overlap each other, at least two cameras can capture with a good focus condition unless the environment is dark, for example, the aperture stop is in the maximum aperture.

Further, generally, a magnification of a subject is equal to "focal length/camera-to-subject distance." Therefore, if ratios of (i) the focal lengths of the first to third cameras 56 to 58 to (ii) the camera-to-subject distances L1 to L3 are set to be a constant value, an image size of a subject obtained when the first camera 56 captures the subject, which comes into the image-capturing range S1, with the camera-to-subject distance L1, an image size of the subject obtained when the second camera 57 captures the subject, which comes into the image-capturing range S2, with the camera-to-subject distance L2 and an image size of the subject obtained when the third camera 57 captures the subject, which comes into the image-capturing range S3, with the camera-to-subject distance L3 are substantially equal to each other. As a result, it is easy to identify the image of the subject, which is a surveillance target, on the monitor screen.

In the above described manner, when an image of a moving object, which is a surveillance target, is acquired in captured screens of the first to third cameras 56 to 58, the optical axis 5a of the telephotographic camera 5 having the angle of view δ can be directed to the moving object based on the position coordinates of the moving object as in the previous embodiment. Thereafter, it is possible to observe the moving object with the telephotographic camera 5 while the telephotographic camera 5 is automatically tracking the moving object. In the embodiment described with reference to FIGS. 8 and 9, it is effective to set finite camera-to-subject distances as the camera-to-subject distances L1 to L3 of the first to third cameras 56 to 58. For example, in the case where this surveillance camera apparatus is provided at a major crossing for the purpose of surveiling, in a depth direction, one straight-line road intersecting the crossing, the first to third cameras 56 to 58 may have the focal lengths 50 mm, 100 m and 200 m and 50 m, 100 m and 200 m as the camera-to-subject distances L1 to L3. Then, if a vehicle, which is a surveillance target, is designated with a color tone in the monitor screen, the surveillance camera apparatus can continuously surveil the designated vehicle, which passed the crossing and is receding on the straight road, and the designated vehicle, which is coming on the straight road to the crossing. Further, when the telephotographic camera captures while tracking, an image of a driver and an image of a license plate can be obtained.

Also, in order to capture an image of a subject with an appropriate size, the camera-to-subject distances L1, L2 and L3 of the first camera 56, second camera 57 and third camera 58, which are used as the three kinds of stationary cameras, are set to be the finite camera-to-subject distances in a stepwise fashion as described above. However, it is inevitable that if the subject is further than the camera-to-subject distance L3, the image size of the subject becomes smaller. In this case, information of the subject may be obtained by using the telephotographic camera 5 effectively. In order to enhance this function, it is desirable that the telephotographic camera 5 has a zooming function so that the subject has an appropriate image size on the monitor.

Figure 10:
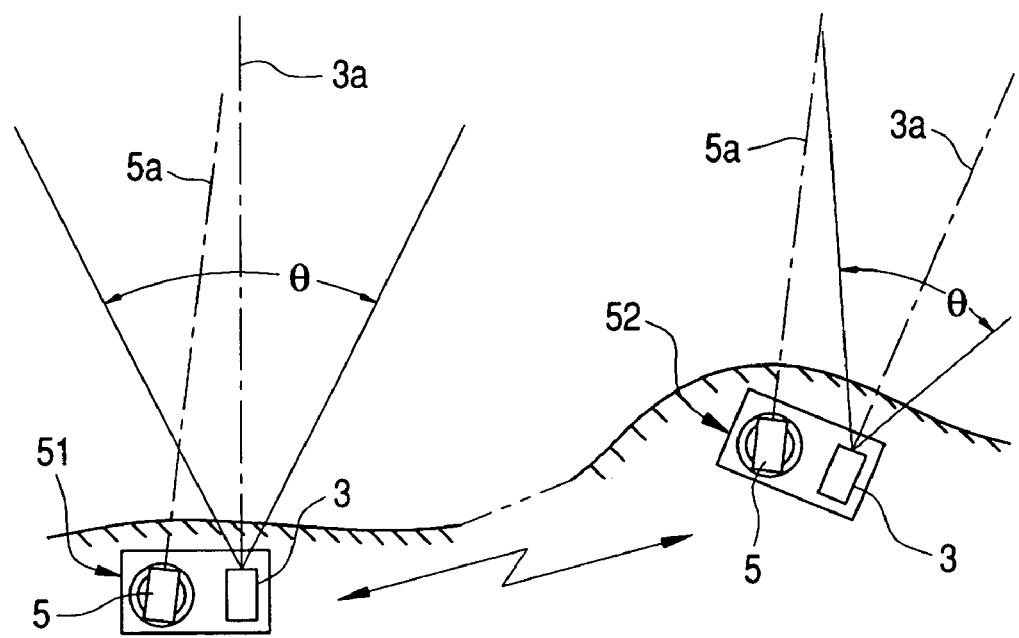
FIG. 10 is a schematic view showing a surveillance camera system according to an embodiment of the invention.

FIG. 10 shows an example of a surveillance system in which two surveillance camera apparatuses according to the embodiment of the invention are combined. A first surveillance camera apparatus 61 and a second surveillance camera apparatus 62 have the same configuration as that of the surveillance camera apparatus shown in FIG. 1. Each surveillance camera apparatus has a wide-angle camera 3 and a telephotographic camera 5. Optical axes 3a of the wide-angle cameras 3 have different aiming directions. Thus, the wide-angle cameras 3 are intended to surveil different areas. The first surveillance camera apparatus 61 and the second surveillance camera apparatus 62 operate independently of each other. The aiming direction of each telephotographic camera 5 depends on directivity information from its corresponding wide-angle camera 3. After that, the telephotographic camera 5 records moving image of a moving object to be watched while automatically tracking the moving object.

In the illustrated example, the angle between the optical axes 3a is set to be a little smaller than a view angle θ of each wide-angle camera 3. The areas surveiled by the wide-angle cameras 3 overlap each other partially. However, this is not essential. The first surveillance camera apparatus 61 and the second surveillance camera apparatus 62 are linked with each other by wireless through transmitting/receiving circuits 34 (FIG. 2). Directivity information and tracking information calculated based on image signals from the wide-angle cameras 3 and the telephotographic cameras 5 are shared between the first surveillance camera apparatus 61 and the second surveillance camera apparatus 62. Further, initial setting information such as latitudes, longitudes and altitudes where the first and second surveillance camera apparatus 51 and 52 are installed, the aiming angles of the optical axes 3a of the wide-angle cameras 3, etc. are also shared between the first and second surveillance camera apparatus 51 and 52.

According to the aforementioned surveillance camera system, the first surveillance camera apparatus 61 and the second surveillance camera apparatus 62 can be put into coordinated operation. Even if the first surveillance camera apparatus 61 cannot perform automatic tracking, the second surveillance camera apparatus 62 can estimate the position of a moving object to be watched based on tracking information sent from the first surveillance camera apparatus 61. Thus, tracking can be resumed by the second surveillance camera apparatus 62 successively. Further, third and fourth surveillance camera apparatus may be installed and linked with each other by wireless or by wire. In this case, a surveiled area may be made wider. Of course, the surveillance camera apparatus shown as embodiments in FIGS. 5 to 9 may be used as the surveillance camera apparatus constituting the surveillance camera system.

The invention has been described above with the illustrated embodiments. Any cameras may be used as the wide-angle camera and the telephotographic camera if they have different view angles relatively. Preferably, it is practical to use a wide-angle camera having a view angle of 90° or more on a 135 film camera basis, and to use a telephotographic camera having a view angle of 30° or less likewise. A variable magnification function (variable view angle function) may be provided for the wide-angle camera. In this case, the wide-angle camera can capture while changing its view angle periodically in every predetermined time. Further, one or plural surveillance camera apparatuses may be controlled by commands from a control room installed in a geographically separated position, so that aiming directions of optical axes of wide-angle cameras or movable ranges of motor-driven camera platform for moving telephotographic cameras can be changed by remote control. In this case, image signals from the wide-angle cameras or the telephotographic cameras are transmitted to the control room so that the images can be monitored in parallel on monitors installed in the control room.

In the embodiments described with reference to FIGS. 1 to 7, if the lenses of the wide-angle camera and the telephotographic camera are focused on infinity, they can capture without any trouble. For example, a contrast-detecting autofocusing device which is usually used in a general digital camera may be used together. In this case, a clear image can be captured even at a close range. Further, image sensors having sensitivity in an infrared region may be used as the image sensors 8 and 9 so that capturing through infrared cut-off filters can be performed in the daytime and capturing without using the infrared cut-off filters can be performed at night. Thus, surveillance can be performed continuously even at night. The invention can be used effectively not only for surveillance to fortify a coastland or a borderland but also for early detection of a victim, for example, if it is installed in a mountain range.

What is claimed is:

1. A surveillance camera apparatus comprising:
a wide-angle camera that converts an optical image obtained through a wide-angle lens into a first image signal, the wide-angle camera that outputs the first image signal, an optical axis of the wide-angle camera being fixed in a constant direction;
a telephotographic camera that converts an optical image obtained through a telephotographic lens into a second image signal, the telephotographic camera that outputs the second image signal, the telephotographic camera supported to be rotatable around at least one pivot axis so that an optical axis of the telephotographic camera can be tilted and panned;
a directivity information calculating unit that identifies an image of a moving object within a image-capturing range of the wide-angle camera based on the first image signal from the wide-angle camera, the directivity information calculating unit that calculates directivity information corresponding to a position of the image of the moving object within the image-capturing range;
a camera posture control unit that rotates the telephotographic camera around the pivot axis in accordance with the directivity information so as to direct the optical axis of the telephotographic camera at the moving object captured by the wide-angle camera; and
a tracking information calculating unit that calculates tracking information, which is used to direct the optical axis of the telephotographic camera so as to place the image of the moving object at a center region of a image-capturing range of the telephotographic camera, based on second image signals sequentially output from the telephotographic camera, wherein:
after the tracking information is calculated, the camera posture control unit is controlled in real time using the tracking information in place of the directivity information and the telephotographic camera continuously captures the moving object, and
wherein the tracking information includes a movement vector of the moving object, and the movement vector is calculated based on the second image signal and an automatically adjustable magnification of the telephotographic camera based on a size of the captured moving object.

2. The apparatus according to claim 1, wherein the telephotographic lens has a variable magnification capability.

3. The apparatus according to claim 1, wherein:
a plurality of wide-angle cameras are provided, and
the wide-angle cameras have different image-capturing ranges and have the same angle of view.

4. The apparatus according to claim 2, wherein:
a plurality of wide-angle cameras are provided, and
the wide-angle cameras have different image-capturing ranges and have the same angle of view.

5. The apparatus according to claim 1, wherein:
the wide-angle camera comprises plural kinds of stationary cameras, which have different focal lengths, focus on longer distances as the focal lengths are longer and have image-capturing ranges substantially equivalent to each other, and
a near-side of a depth of field of one stationary camera overlaps a far-side of a depth of field of another stationary camera, whose focused position is adjacent to that of the one stationary camera.

6. The apparatus according to claim 5, wherein:
at least one of the stationary cameras includes a combination of a plurality of camera modules, which have angles of view equal to each other, have focal lengths equal to each other and are arranged so that directions of capturing optical axes are different from each other, and
the camera modules individually captures areas, which are defined by dividing the image-capturing range equally.

7. The apparatus according to claim 2, wherein:
the wide-angle camera comprises plural kinds of stationary cameras, which have different focal lengths, focus on longer distances as the focal lengths are longer and have image-capturing ranges substantially equivalent to each other, and
a near-side of a depth of field of one stationary camera overlaps a far-side of a depth of field of another stationary camera, whose focused position is adjacent to that of the one stationary camera.

8. The apparatus according to claim 7, wherein:
at least one of the stationary cameras includes a combination of a plurality of camera modules, which have angles of view equal to each other, have focal lengths equal to each other and are arranged so that directions of capturing optical axes are different from each other, and
the camera modules individually captures areas, which are defined by dividing the image-capturing range equally.

9. The apparatus according to claim 1, wherein:
a plurality of telephotographic cameras and a plurality of camera posture control units are provided,
when one or more wide-angle camera captures a plurality of images of moving objects, the directivity information calculating unit calculates plural pieces of directivity information, and
the pieces of directivity information are input to the plurality of camera posture control units individually.

10. The apparatus according to claim 2, wherein:
a plurality of telephotographic cameras and a plurality of camera posture control units are provided,
when one or more wide-angle camera captures a plurality of images of moving objects, the directivity information calculating unit calculates plural pieces of directivity information, and
the pieces of directivity information are input to the plurality of camera posture control units individually.

11. The apparatus according to claim 3, wherein:
a plurality of telephotographic cameras and a plurality of camera posture control units are provided,
when one or more wide-angle camera captures a plurality of images of moving objects, the directivity information calculating unit calculates plural pieces of directivity information, and
the pieces of directivity information are input to the plurality of camera posture control units individually.

12. The apparatus according to claim 5, wherein:
a plurality of telephotographic cameras and a plurality of camera posture control units are provided,
when one or more wide-angle camera captures a plurality of images of moving objects, the directivity information calculating unit calculates plural pieces of directivity information, and
the pieces of directivity information are input to the plurality of camera posture control units individually.

13. A surveillance camera system comprising:
a plurality of surveillance camera apparatuses according to claim 1, wherein:
the surveillance camera apparatuses are disposed so that optical axes of wide-angle cameras of the surveillance camera apparatuses are different from one another, and
the directivity information and the tracking information are shared among the surveillance camera apparatuses.

14. A surveillance camera system comprising:
a plurality of surveillance camera apparatuses according to claim 2, wherein:
the surveillance camera apparatuses are disposed so that optical axes of wide-angle cameras of the surveillance camera apparatuses are different from one another, and
the directivity information and the tracking information are shared among the surveillance camera apparatuses.

15. A surveillance camera system comprising:
a plurality of surveillance camera apparatuses according to claim 3, wherein:
the surveillance camera apparatuses are disposed so that optical axes of wide-angle cameras of the surveillance camera apparatuses are different from one another, and
the directivity information and the tracking information are shared among the surveillance camera apparatuses.

16. A surveillance camera system comprising:
a plurality of surveillance camera apparatuses according to claim 5, wherein:
the surveillance camera apparatuses are disposed so that optical axes of wide-angle cameras of the surveillance camera apparatuses are different from one another, and
the directivity information and the tracking information are shared among the surveillance camera apparatuses.

17. A surveillance camera apparatus comprising:
a wide-angle camera that converts an optical image obtained through a wide-angle lens into a first image signal, the wide-angle camera that outputs the first image signal, an optical axis of the wide-angle camera being fixed in a constant direction;
a telephotographic camera that converts an optical image obtained through a telephotographic lens into a second image signal, the telephotographic camera that outputs the second image signal, the telephotographic camera supported to be rotatable around at least one pivot axis so that an optical axis of the telephotographic camera can be tilted and panned;
a directivity information calculating unit that identifies an image of a moving object within a image-capturing range of the wide-angle camera based on the first image signal from the wide-angle camera, the directivity information calculating unit that calculates directivity information corresponding to a position of the image of the moving object within the image-capturing range;
a camera posture control unit that rotates the telephotographic camera around the pivot axis in accordance with the directivity information so as to direct the optical axis of the telephotographic camera at the moving object captured by the wide-angle camera; and
a tracking information calculating unit that calculates tracking information, which is used to direct the optical axis of the telephotographic camera so as to place the image of the moving object at a center region of a image-capturing range of the telephotographic camera, based on second image signals sequentially output from the telephotographic camera, wherein:
after the tracking information is calculated, the camera posture control unit is controlled in real time using the tracking information in place of the directivity information and the telephotographic camera continuously captures the moving object,
wherein the tracking information includes a movement angle of the moving object, and the movement angle is calculated based on the second image signal and a view angle of the telephotographic camera, and
wherein the tracking information includes a movement vector of the moving object, and the movement vector is calculated based on the second image signal and an automatically adjustable magnification of the telephotographic camera based on a size of the captured moving object.

18. A surveillance camera apparatus comprising:

a wide-angle camera that converts an optical image obtained through a wide-angle lens into a first image signal, the wide-angle camera that outputs the first image signal, an optical axis of the wide-angle camera being fixed in a constant direction;

a telephotographic camera that converts an optical image obtained through a telephotographic lens into a second image signal, the telephotographic camera that outputs the second image signal, the telephotographic camera supported to be rotatable around at least one pivot axis so that an optical axis of the telephotographic camera can be tilted and panned;

a directivity information calculating unit that identifies an image of a moving object within a image-capturing range of the wide-angle camera based on the first image signal from the wide-angle camera, the directivity information calculating unit that calculates directivity information corresponding to a position of the image of the moving object within the image-capturing range;

a camera posture control unit that rotates the telephotographic camera around the pivot axis in accordance with the directivity information so as to direct the optical axis of the telephotographic camera at the moving object captured by the wide-angle camera; and a tracking information calculating unit that calculates tracking information, which is used to direct the optical axis of the telephotographic camera so as to place the image of the moving object at a center region of a image-capturing range of the telephotographic camera, based on second image signals sequentially output from the telephotographic camera, wherein:

after the tracking information is calculated, the camera posture control unit is controlled in real time using the tracking information in place of the directivity information and the telephotographic camera continuously captures the moving object, wherein the tracking information calculating unit obtains the tracking information by comparing sequential second image signals from the telephotographic camera to calculate movement information of the image of the moving object, and wherein the tracking information includes a movement vector of the moving object, and the movement vector is calculated based on the second image signal and an automatically adjustable magnification of the telephotographic camera based on a size of the captured moving object.

\* \* \* \* \*